Patented Oct. 10, 1933

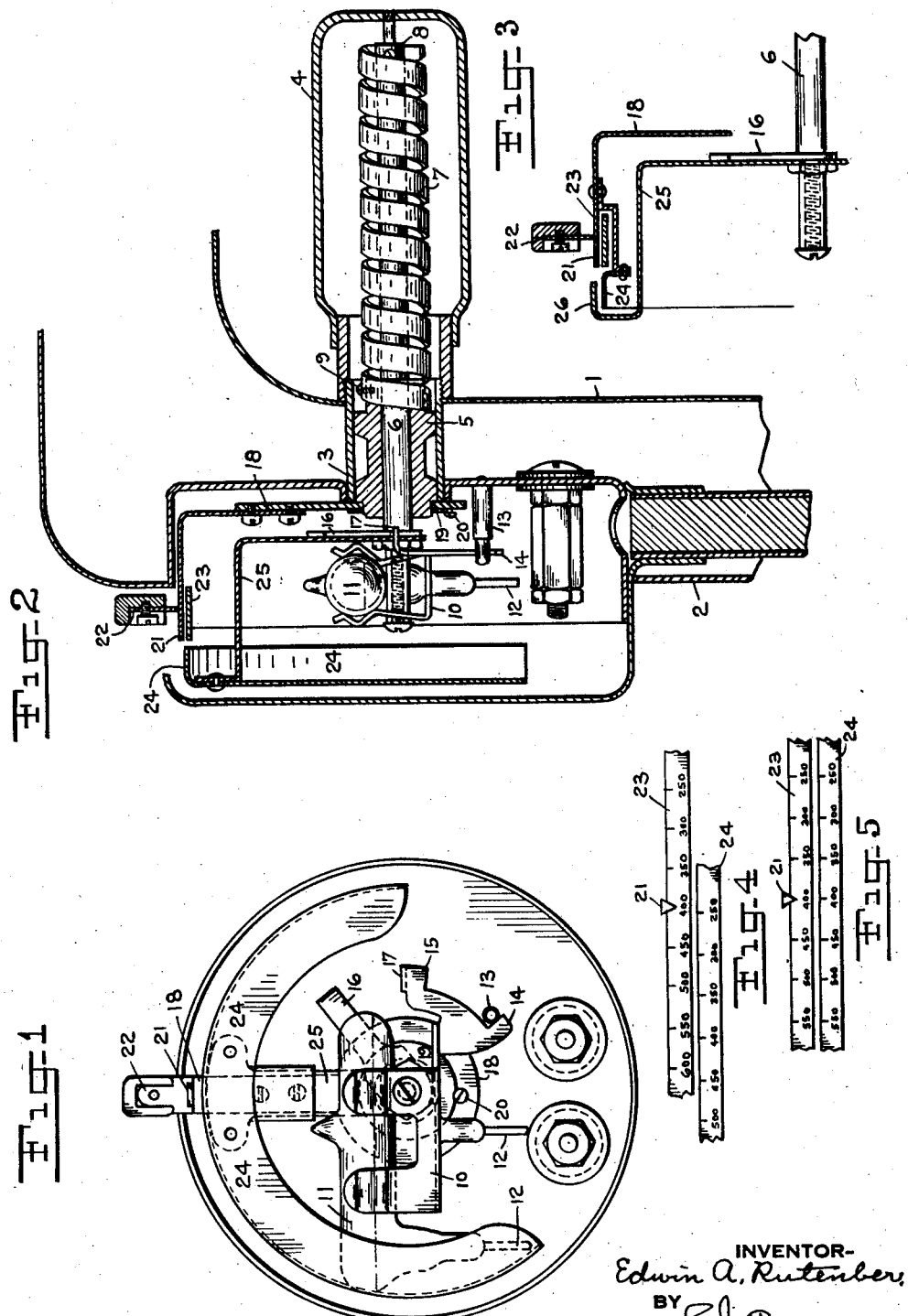

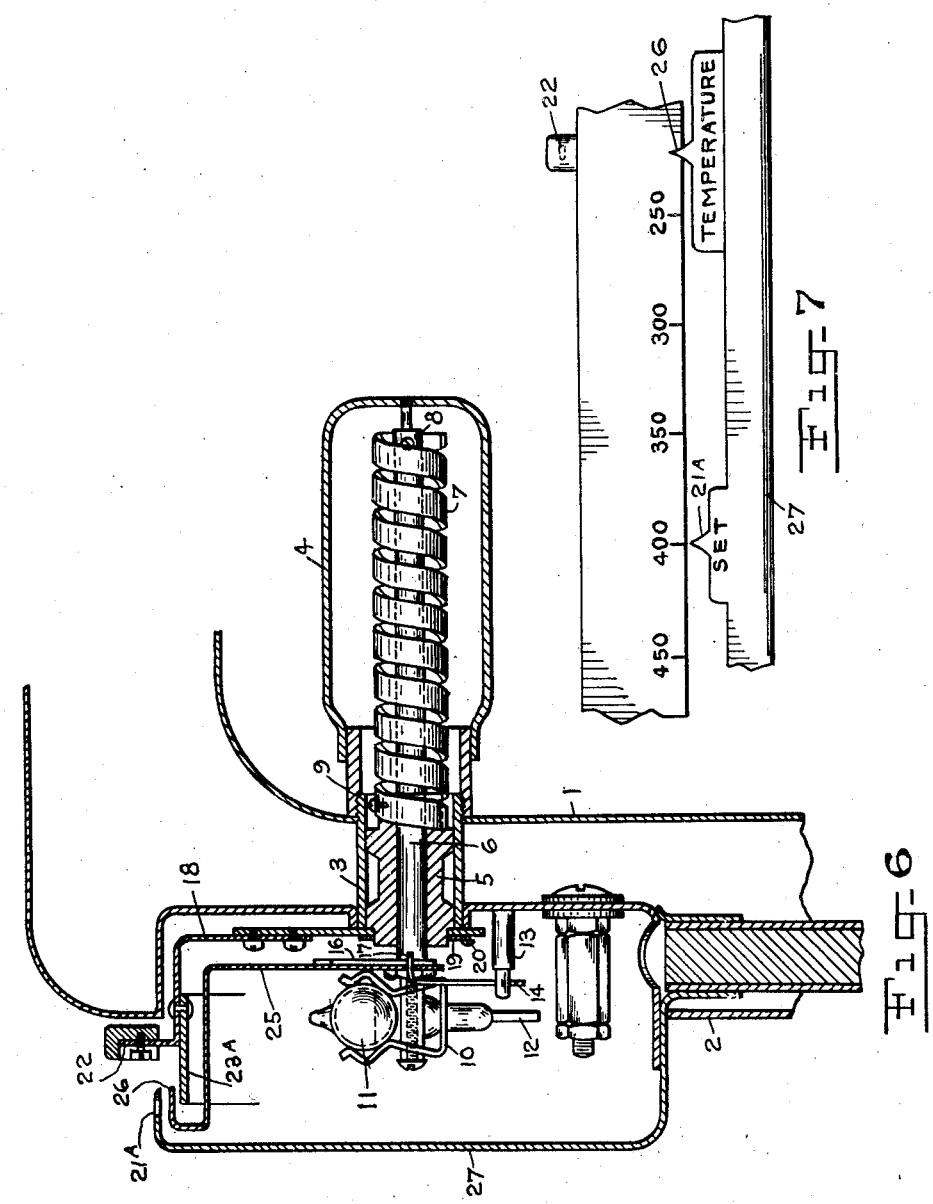

1,930,062

UNITED STATES PATENT OFFICE 1,930,062

TEMPERATURE INDICATING THERMOSTAT

Edwin A. Rutenber, Milwaukee, Wis., assignor to A. J. Lindemann & Hoverson Company, Milwaukee, Wis., a corporation of Wisconsin Application October 14, 1931. Serial No. 568,743

16 Claims. (Cl. 200—139)

The improvements relate to thermally operated devices for automatically controlling the temperature of ovens, water heaters and the like, and are primarily adapted to be used in connection with apparatus of the type aforementioned which are arranged to be electrically heated, but have other applications. Their objects are, among others, the provision of a thermostatic control which may be adjusted and set so as to maintain various temperatures by acting on the heating medium and preventing it from raising the temperature above or permitting it to fall below the predetermined point and to make the mechanism whereby the control is effected, accurate and dependable in its operation.

A further object is to improve the construction and arrangement of parts, including the heat responsive member, switch and their connections, rendering same more efficient, durable and strengthening as well as simplifying the construction and assembly thereof; and to reduce the number of operative parts to a minimum, and to dispose them in compact and intimate relation.

The present improvements are further designed to provide a novel and improved thermostatic control device having temperature indicating mechanism whereby the degree of heat attained, may be accurately and constantly indicated. The provision of such an organization, having a novel arrangement of scales and pointers, constitutes a further object of the invention. Other objects and advantages will be apparent to those skilled in the art upon reference to the accompanying specification and drawings, in which—

Fig. 1 is a front elevation of a thermostatic switch, showing one form of the improvements;

Fig. 2 is a side sectional view of the improvements, mounted in an oven wall;

Fig. 3 is a fragmentary view of a modified form;

Figs. 4 and 5 are fragmentary diagrammatic views of the scales and pointer under various conditions;

Fig. 6 is a side sectional view of another modified form; and

Fig. 7 is a fragmentary diagrammatic view of the scale and pointers of the form illustrated in Fig. 6.

The thermostatic device or temperature control of the present improvements is designed to be mounted on or built into an oven or water heater with the indicators exposed to facilitate observation and control thereof and with the thermally responsive element exposed to the medium to be heated.

Referring to the drawings, one form of the improvements is illustrated in Fig. 2 mounted in the oven wall of a range, which comprises the inner and outer walls 1 and 2 respectively. As illustrated, these walls are suitably recessed and perforated to accommodate the parts of the control device. A fixed tubular bearing 3, carrying the guard cage 4, permits access to the oven interior, for insertion of the thermal elements and related parts.

Slidably housed within the bearing 3, is a rotatable sleeve 5, constituting a supporting member. Said sleeve is axially bored to receive and loosely support an actuating shaft 6. As illustrated, the shaft 6 protrudes a substantial distance in each direction beyond the limits of sleeve 5. The right hand ends of the sleeve and shaft are connected by a thermally responsive helical coil or band 7, having one end fixed at 8 to shaft 6 and the other end fixed at 9 to sleeve 5.

The free end of shaft 6 provides a support or fulcrum upon which a cradle or holder 10 is loosely mounted for pivotal movement. A mercury tube contactor 11 having connections 12 is eccentrically mounted in the holder 10, the arrangement being such that the switch unit is overbalanced for movement in a counter clockwise direction. This result may be obtained by providing weighted means, or a spring, if desired. As illustrated, a fixed pin 13, is positioned for engagement with lugs 14 and 15, on holder 10, thereby limiting rocking movement of the switch in both directions.

An actuating arm 16 is keyed or otherwise fixed to shaft 6, whereby the former describes an arcuate course in response to movements of said shaft. It is notable that rotation of shaft 6, in response to thermal expansion of coil 7 will rock arm 16 in a clockwise direction relative to contactor 11, (Fig. 1) until it encounters lug 17 on holder 10, whereupon the holder and contactor are also rocked by shaft 6 and arm 16, until the mercury gravitates in the contactor and breaks the circuit. Restoration of the switch to circuit closing position, is accomplished upon cooling of the thermal element, whence arm 16 is withdrawn, and the switch unit returns, under its own weight, to horizontal position (Fig. 1). The foregoing structure constitutes a portion of the structure illustrated in my Patent No. 1,783,309, dated December 2, 1930.

Referring more particularly to Fig. 2, an arm 18 is rotatably mounted on a hub or projecting portion of sleeve 5, but is frictionally held to said sleeve by a disc 19 keyed to the hub. A set screw 20 is provided on arm 18, which functions to secure disc 19 and arm 18 in fixed relation, so that they may move in unison. Accordingly, movement of arm 18, causes a like movement of sleeve 5, thermal band 7, shaft 6 and arm 16, all of these elements moving as a unit, relative to bearing 3, contactor 11 and holder 10. To adjust the arm 18 with respect to sleeve 5, for calibration purposes, it is only necessary to loosen screw 20, and move the elements relatively to the desired extent and then secure them together by tightening the screw.

The arm 18 extends upwardly and forwardly, as illustrated where it terminates in an indicating pointer 21 which may be set by grasping handle 22. A fixed scale 23, calibrated with temperature readings, is disposed beneath pointer 21, and may be termed generally a setting scale, since the pointer 21 may be moved and set opposite the temperature on scale 23, at which it is desired to have the heat turned off by opening the switch 11.

A second segmental scale 24, which specifically indicates degrees of temperature, is fixed to an arm 25, which arm is keyed or otherwise directly secured to shaft 6 for moving as a unit therewith, in response to movement of thermal band 7. As illustrated, the movable arcuate scale 24 is disposed adjacent to the fixed arcuate scale 23 the relation being such that indicator 21 functions with both scales. It is notable that manual movement of pointer 21, will cause the entire structure to move as a unit, such parts including sleeve 5, coil 7, shaft 6, arm 16 and scale 24. However, thermal movement of coil 7, as for example, by expansion due to heat, will move only shaft 6, arm 16 and scale 24 as a unit, until a sufficient degree is reached, whereupon lug 17 is encountered and the switch is opened, as previously set forth. In order that the relation of the scales and indicator may be more clearly understood, a fragmentary showing of the scales, laid out flat, may be seen in Figs. 4 and 5.

As previously stated, the fixed scale 23 is calibrated in degrees of temperature, at which it is desired to set the device for operation. For example, if the attendant desires the oven temperature to be 400°, he may set the pointer 21 opposite that reading on scale 23. Upon closing the manual switch (not shown) the oven begins to heat up, but the attendant cannot learn from scale 23, whether or not the 400° mark is being approached or maintained, and therefore has no assurance that the heat required for the particular food, is being provided.

In the present improvements, however, the movable scale 24 moves with pointer 21, when the latter is set. This scale likewise is calibrated with temperature readings, beginning preferably at about 250° and upward. In an inactive or at rest position, the pointer 21, may be opposite a reading below 250°. Since that may be termed the lowest useful temperature, there is little or no necessity of knowing oven temperatures below it. This may therefore be termed the lowest effective temperature, being in the nature of a starting point, similar to zero.

Referring to Fig. 4, it will be seen that the indicator 21 has been set opposite the 400 degree reading on fixed scale 23, which is the temperature desired in the oven. The setting of pointer 21, moves scale 24 also, the former always being opposite a reading under 250°, when in the inactive position. Upon closing the manual switch (not shown), the oven will be heated, but no temperature may be recorded until 250° is approached. As the temperature rises, the band 7 will expand, thereby rocking shaft 6, and moving arm 16 and scale 24 to the right (Fig. 1). Pointer 21 will manifestly remains opposite the set degree of 400 (on fixed scale 23) while continued rise in temperature, will cause indicating scale 24 to move relative to scale 23 and pointer 21, so that an attendant may observe the exact temperature of the oven by taking the reading on scale 24 which is opposite pointer 21.

The attendant is thus able to know that the oven is being heated up, and that the temperature for which the device is set, is being approached. The attendant is therefore able at all times to know the exact temperature of the oven. When the oven has been heated to the degree for which the device has been set, in the assumed instance 400°, the band 7 has rotated shaft 6 to such an extent that arm 16 encounters lug 17, thereby tilting the contactor 11 and breaking the circuit. Likewise, shaft 6 has moved indicating scale 24, relative to pointer 21, until the 400° reading on scale 24 is aligned with pointer 21 and the same reading on scale 23, as seen in Fig. 5. The attendant therefore knows and is assured that the oven has attained that temperature, and that the food will be subjected to the necessary degree. If scale 24 were not provided, the attendant would be unable to tell, whether the food is properly cooked or whether the prescribed temperature has ever been reached.

It is notable that a simple, compact indicating and setting construction has been provided. As aforementioned, the fixed and movable scales, 23 and 24 respectively, are in juxtaposition so that a single indicator 21 may be employed for reading temperatures on both. This relation of parts is advantageous, since merely setting pointer 21, is all that is necessary to attain the desired results. Upon setting pointer 21, the scale 24 and pointer 21 move as a unit relatively to scale 23. However, upon heating of the band 7, the indicating scale 24 moves relatively to pointer 21 and scale 23.

In addition to the foregoing unitary and relative movement of the parts, it will be observed that while the arm 18 and pointer 21 are moved in unison with sleeve 5, they may also be moved adjustably relative to said sleeve, as well as relative to the contactor 11. The numerous movements of the various parts in unison and relative to one another, contributes to the efficiency and practicability of the structure.

Although the movable scale 24, may be calibrated in the manner above described, the readings thereon may be variously arranged, beginning at zero, if desired. Any desired arrangement may be provided, so long as the actual and correct temperature of the oven may be read off of the scale opposite the pointer.

A modified arrangement of the scales and pointer is illustrated in Fig. 3. In that showing, the movable scale 24, is mounted on arm 18, being fixed for movement with pointer 21. Likewise, the scale on arm 25 is dispensed with, and a pointer 26 is provided thereon. Accordingly, when the device is set, pointers 21, 26 and scale 24 are moved in unison. However, when shaft 6 is rocked by expansion of the thermal element, pointer 21 and scale 24 remain stationary, while pointer 26 moves relative to both, for indicating on scale 24, the degree of temperature attained in the oven. This modified form is adapted for use with the other elements illustrated in Figs. 1 and 2.

Numerous advantages of the improvements will be apparent from the foregoing description. Simplicity of construction and operation constitutes a main factor contributing to the efficiency of the device. By providing the additional indicating scale 24, there is no opportunity for confusion on the part of the attendant. In devices having only a fixed scale 23 and pointer 21, employed for setting, there is a possibility that the attendant may inadvertently consider it as a temperature indicating device, and thereupon labor under the impression that the desired temperature has been attained. Such misleading impressions and confusion are not possible where the fixed or setting scale is supplemented by a movable and accurately indicating temperature scale. With the disclosed arrangement, the attendant may observe at a glance, the temperature reading for which the device has been set and the actual temperature, in degrees, that exists in the oven at the moment of observation. He may therefore discern whether the fuel is being properly supplied, by observing whether the heat is increasing at the proper rate, as evidenced by the indicating scale.

A further modification of the improvements has been illustrated in Figs. 6 and 7. In that form, the scale 23A, calibrated in temperature readings, is fixed to the arm 18, both of which are movable, for setting purposes, by handle 22. The scale 24, used in the other modifications, is dispensed with, the scale 23A being employed instead, as will hereinafter appear. It may be stated, however, that this is a combination scale used both for thermostatic setting, as well as for temperature reading. As in the modification of Fig. 3, so also in this form, the arm 25, which is keyed or otherwise fixed to shaft 6, is provided with a pointer 26, which is associated with scale 23A, so as to indicate thereon the thermal condition of the coil 7 in terms of temperature.

An additional pointer 21A is fixed to the outside shell or cover 27, so as to be stationary with respect to the movable pointer 26 and scale 23A. As illustrated, in Figs. 6 and 7, the handle 22 may be grasped, and the pointer 26 and scale 23A moved, until the temperature, it is desired to attain, is indicated on scale 23A by fixed or "setting" indicator 21A. After the current has been turned on, and the heat increases, the "temperature" indicating pointer 26 moves relative to scale 23A and pointer 21A, approaching the latter, thereby indicating to an observer, the actual temperature experienced by coil 7. Manifestly, the observer can readily determine when the desired temperature is reached, since both pointers will be in register opposite the same reading on the scale. In this form therefore, the organization differs from those previously described, and employs a single movable scale and two pointers associated therewith, one fixed and the other movable.

The present improvements in all the illustrated forms, avoid any possibility of error in indicating the temperature, due to the positive and direct connection between the indicating members and the thermal coil. Each movement of coil 7 in response to temperature changes, is transmitted directly to scale 24 (Fig. 2) or to pointer 26 (Figs. 3 and 6) which accurately reveals same to the observers. There is, therefore, no lost motion, due to friction or otherwise, between the parts, which could cause a difference between the actual and the indicated temperatures.

Other modifications within the scope of the present improvements, may be apparent to those skilled in the art, and may be adopted without departing from the purview of the invention.

I claim:

1. A thermostatic device comprising a movable contactor, a thermal member for moving said contactor at a predetermined temperature, a temperature scale operatively connected to said thermal member, a fixed temperature scale asociated with said first named scale, a pointer associated with said scales and operatively connected with said thermal member at a point spaced from the connection of said first scale, and means whereby said first named scale and pointer may move in unison, or relatively in response to thermal conditions.

2. A thermostatic device comprising a movable contactor, a thermal member for moving said contactor at a predetermined temperature, a movable temperature scale having a direct connection with said thermal member, a fixed temperature scale associated with said first named scale, a pointer for indicating readings on both scales operatively connected with said thermal member and first named scale for moving same in unison, said pointer and first named scale being connected to said member at spaced points, and means whereby said movable scale moves relative to said pointer and fixed scale, in response to temperature changes.

3. In combination, a movable contactor, a thermal member for operating same, a fixed scale, a setting arm connected with said member and movable along said scale for predetermining the degree at which said member will move said contactor, and an indicating arm connected with said member in spaced relation with respect to said first arm and movable with said first named arm during setting movement, said indicating arm being in juxtaposition of said setting arm, and thence movable relative thereto in response to thermal changes of said member for indicating the degree of movement of said thermal member.

4. A thermostatic control for electrical apparatus comprising a pivoted circuit maker and breaker, a thermal element for rocking said maker and breaker, a fixed scale, indicating means cooperating with said scale and connected with said element for setting the element at the degree it is desired to be operated, and means cooperating with said indicating means and movable by said element for indicating the thermal condition thereof.

5. A thermostatic device comprising a movable supporting member, a movable contactor, actuating means for moving said contactor, a thermally responsive element connected with said member and positioned to impart movement to said actuating means, said contactor being mounted loosely with respect to said actuating means, means for moving said member and element as a unit relative to said contactor and an indicator connected to said thermal element for indicating the movement thereof in response to temperature changes, relative to said member.

6. A thermostatic device comprising a movable supporting member, a movable contactor, actuating means for moving said contactor, a thermally responsive element connected with said member and positioned to impart movement to said actuating means, said contactor being mounted loosely with respect to said actuating means, means for moving said member and element as a unit relative to said contactor, said last named means being adjustable relative to said contactor and to said member, and an indicator connected to said thermal element for indicating the movement thereof in response to temperature changes, relative to said member.

7. A thermostatic device comprising a movable supporting member, a movable contactor, actuating means for moving said contactor, a thermally responsive element connected with said member and positioned to impart movement to said actuating means, said contactor being mounted loosely with respect to said actuating means whereby said means may move said contactor relative to said member upon rise in temperature, an arm frictionally secured to said member for manually moving said member and element as a unit relative to said contactor, said arm being adjustable relative to said contactor and member, and an indicating arm fixed to said element and movable relative to said first named arm in response to temperature changes.

8. A thermostatic device comprising a movable supporting member, an actuating shaft supported by said member, thermally responsive means connecting said member and shaft, a contactor journaled on said shaft comprising fixed electrical terminals and a conducting body movable therebetween, a scale, a setting arm for moving said shaft and thermal means relative to said contactor, a pointer on said arm movable along said scale, and a temperature indicating arm fixed to said shaft and movable along said scale.

9. A thermostatic device for controlling an electric circuit comprising a heat operated element including a thermostatic metallic coil, a circuit closing device including a tiltable vessel, terminals and a fluent conductor therein, lost-motion means intermediate said circuit closing device and said heat operated element for operating the former to break the circuit by the heat expansion of the latter, means for varying the point at which the said intermediate means will cause circuit breaking movement of said device without changing the relative positions of said device and said element and means responsive to movements of said heat operated element including a cooperating scale and pointer for indicating the degree of movement thereof relative to said last named means.

10. A thermostatic device comprising a movable contactor, actuating means for moving said contactor, a thermal member for moving said means, a setting arm operatively connected with said means and member for disposing same in position for actuating said contactor at a prescribed temperature, a fixed scale, a pointer movable with said arm along said scale, a temperature indicating arm associated with said scale and operatively connected to said thermal member at a point spaced from the connection of said setting arm, said indicating arm being movable along said pointer by thermal movement of said thermal member.

11. A thermostatic device comprising a movable contactor, actuating means for moving said contactor, a thermal member for moving said means, a setting arm operatively connected with said means and member for disposing same in position for actuating said contactor at a prescribed temperature, a fixed scale, a pointer movable with said arm along said scale, a movable temperature indicating scale opposite said fixed scale and pointer and operatively connected to said thermal member for movement in response to expansion and contraction thereof, said setting arm and movable scale having spaced connections with said thermal member.

12. A thermostatic device comprising a movable contactor, actuating means for moving said contactor, a thermal member for moving said means, a manually operable pointer operatively connected with said actuating means and thermal member for disposing same in position for actuating said contactor at a given temperature, a fixed scale positioned adjacent said pointer, a movable temperature indicating scale opposite said pointer and fixed scale, and connected to said thermal member in spaced relation with the connection of said pointer.

13. A thermostatic device comprising a movable contactor, actuating means for moving said contactor, a thermal member for moving said means, a manually operated setting arm for moving said thermal member for disposing same in position for actuating said contactor at a prescribed temperature, a scale fixed to said arm and movable therewith, a temperature indicating pointer movable along said scale and operatively connected to said actuating means, and a stationary pointer associated with said scale.

14. A thermostatic device comprising a movable contactor, actuating means for moving said contactor, a thermal member for moving said means, a manually operable scale for moving said thermal member for disposing same in position for actuating said contactor at a given temperature, a stationary pointer opposite said scale, and a movable temperature indicating pointer movable along said scale and first named pointer, and operatively connected to said actuating means and thermal member for movement in response to expansion and contraction thereof.

15. A thermostatic device comprising a movable contactor, a thermal member for moving said contactor, a fixed scale, a pointer manually movable along said scale and rigidly fixed to said thermal member for moving the latter relative to said contactor, and a movable scale rigidly fixed to said thermal member and responsive to expansion and contraction thereof said pointer and movable scale being fixed at spaced points to said member, said movable scale being positioned for travel along said fixed scale and pointer.

16. In a thermostatic device, a fixed scale, a coiled thermostatic member, a pointer rigidly connected with one end of said coiled member and manually movable along said scale for adjusting the position of said coiled member, an indicator opposite said scale, said indicator rigidly connected with the other end of said coiled member whereby expansion and contraction of said member causes said indicator to travel along said scale.

EDWIN A. RUTENBER.